Figure 1:
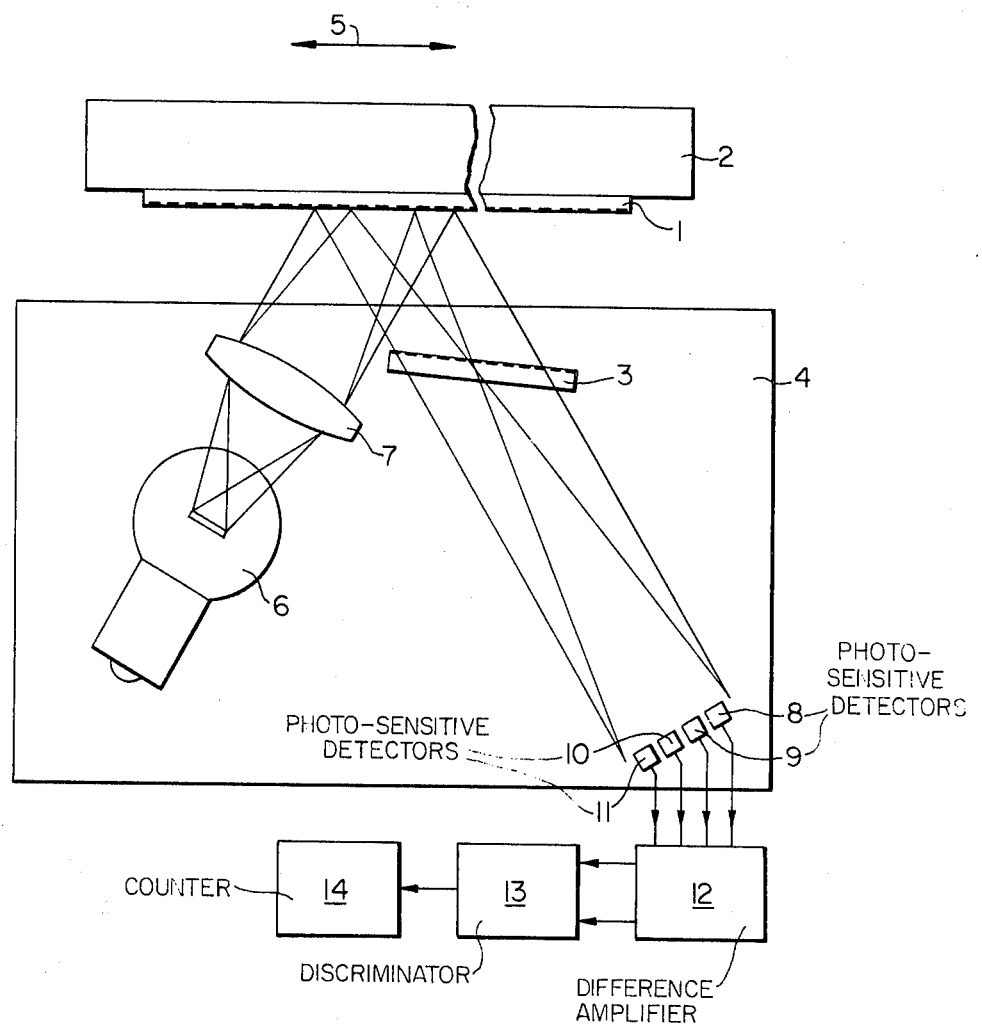

United States Patent [19]

Brake

[11] 4,079,252
[45] Mar. 14, 1978

[54] PHOTOELECTRIC GRATING DISPLACEMENT MEASURING APPARATUS

[75] Inventor: David George Brake, Welwyn Garden City, England

[73] Assignee: Ferranti Limited, Hollinwood, England

[21] Appl. No.: 716,229

[22] Filed: Aug. 20, 1976

[30] Foreign Application Priority Data

Aug. 22, 1975 United Kingdom ............ 34859/75

[51] Int. Cl.² .............................................. H01J 3/14
[52] U.S. Cl. .................................. 250/237 G; 356/169
[58] Field of Search ......... 250/231 R, 231 SE, 237 R, 250/237 G; 356/169, 170; 340/347 P

[56] References Cited

U.S. PATENT DOCUMENTS

| 3,578,979 | 5/1971 | Kawaguchi et al. | 356/170 |
|---|---|---|---|
| 3,599,004 | 8/1971 | Grendelmeier | 250/237 G |
| 3,748,043 | 7/1973 | Zipin | 250/237 G |
| 3,796,498 | 3/1974 | Post | 250/237 G |
| 3,812,352 | 5/1974 | MacGovern | 356/169 |

Primary Examiner—David C. Helms
Attorney, Agent, or Firm—Cameron, Kerkam, Sutton, Stowell & Stowell

[57] ABSTRACT

A measuring system includes a scale grating carried on one of two relatively movable bodies and an index grating carried on the other. The scale grating is illuminated directly in such a way that light passing from it to the index grating is at least partially diffuse. Detector means are provided to respond to the resulting spatially periodic distribution of illumination.

10 Claims, 3 Drawing Figures

PHOTOELECTRIC GRATING DISPLACEMENT MEASURING APPARATUS

This invention relates to measuring apparatus of the type using gratings to produce fringe effects.

Measuring apparatus of this type is that in which the movement of one member with respect to another member is determined from signals derived from one or more photoelectric transducers responding to the spatially periodic distribution of radiation produced by the interaction of two or more gratings having periodic variations of transmittance, reflectance or wavefront phase retardation acting upon incident radiation. The gratings are arranged to move relatively to one another in a plane parallel to the plane of the first grating and electrical stages are provided by which the detection or measurement is derived from the photo-electric signals. Such measuring apparatus is well-known and is typically described in British Pat. No. 914,438 wherein radiation passes through a first grating to be reflected at a second grating and re-passes through the first grating before impinging upon photoelectric transducers.

Most of the known apparatus requires a small gap to be accurately maintained between the two or more gratings as the motion takes place. Apparatus designed to avoid this problem has been disclosed in Paper No. 20 given at the conference on Metrology at the Birniehill Institute, National Engineering Laboratory, East Kilbridge, Glasgow, on Oct. 15/18 1974 by G. L. Purfit, C. A. W. Woodward and R. M. Pettigrew wherein three gratings (or two gratings where radiation passes twice through one) are employed, allowing a considerable gap having a considerable tolerance between the gratings to be used.

A further problem encountered in the use of all such measuring apparatus, especially when employed on machine-tools where liquid contamination of the "scale" grating is difficult to avoid, is the refractive deflection of the radiation by liquid contamination on the scale, which deflection, or that due to an imperfectly flat scale, causes either a displacement or a modulation of the distribution of radiation detected by the photoelectric transducers.

Yet another problem often encountered is the imbalance of the two or more photoelectric signals due to contamination of part only of the radiated area of the scale grating.

It is an object of the present invention to provide measuring apparatus of the kind set forth in which liquid contamination of the scale grating or imperfections in its flatness do not cause faulty operation or substantial errors in measurement.

It is a further object to provide measuring apparatus in which contamination of part only of the radiated area of the scale grating does not cause faulty operation or substantial errors in measurement.

Yet another object is to provide measuring apparatus in which the gratings are separated by a considerable gap having a considerable tolerance, so avoiding errors of measurement or damage due to imperfect motion of the one member relative to the other member.

According to the present invention there is provided apparatus for detecting or measuring the motion of a first member relative to a second member, which includes a scale grating attached to one of the two members and extending in a direction parallel to the direction of said relative motion, an index grating carried by the other of the two members, means for illuminating the scale grating directly with radiation such that radiation passing from the scale grating to the index grating is at least partially diffuse, and detector means for detecting the resulting spatially periodic distribution of radiation produced by the index grating.

The detector means may include a lens or a mirror arranged to focus the spatially periodic distribution of radiation on to photoelectric transducers arranged to respond to different parts of the distribution. Alternatively the detector means may include a third grating arranged to selectively transmit or reflect the radiation onto photoelectric transducers arranged to respond to different parts of the distribution.

Figure 2:
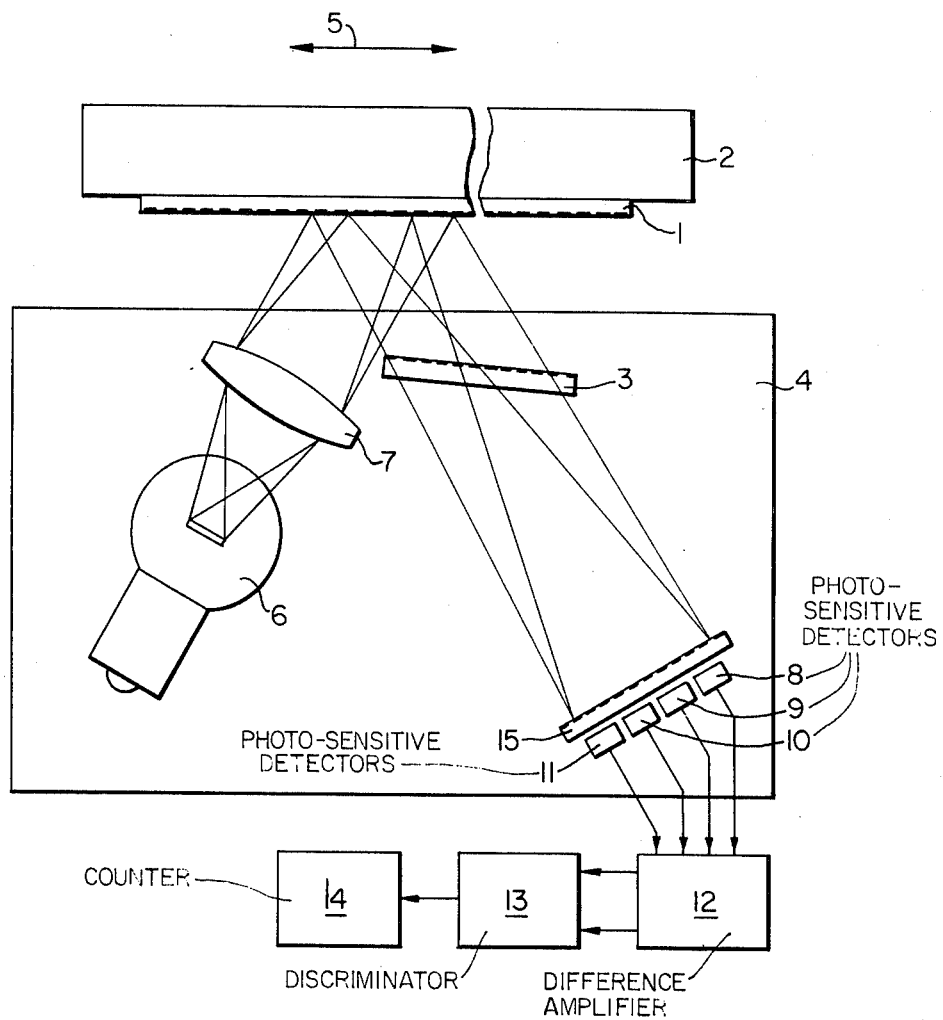
Figure 3:
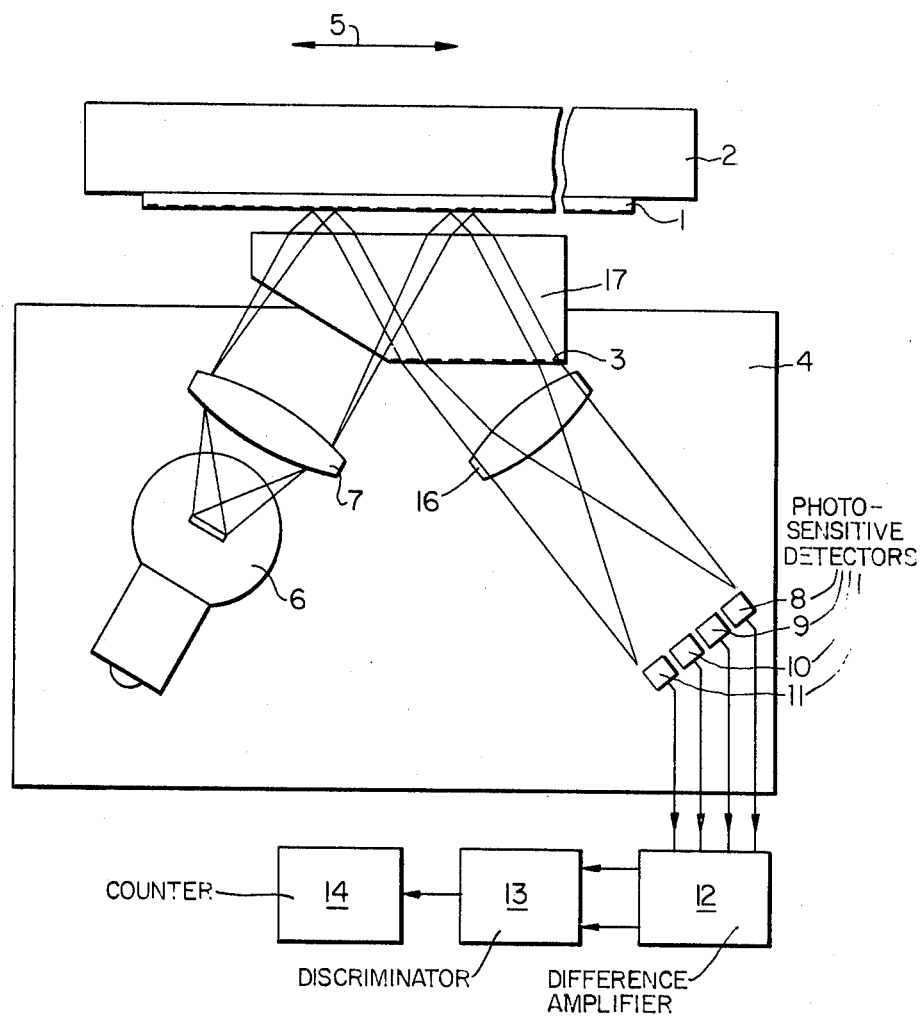

The invention will now be described with reference to the accompanying drawings, in which:

FIG. 1 is a schematic diagram of a first embodiment;
FIG. 2 is a similar diagram of a second embodiment; and
FIG. 3 illustrates a third embodiment.

Referring now to FIG. 1, a long reflective scale grating 1 is attached to a first member 2 of the two relatively movable members. A shorter transmissive index grating 3 is carried by the other of the members 4. Grating 1 is arranged parallel to the direction of relative motion indicated by the arrow 5.

A filament light source produces radiation which is at least partially diffuse, and this is concentrated by a lens 7 directly on to the scale grating 1. Some of the light reflected from the scale grating 1 passes through the index grating 3 and impinges on detector means in the form of four photo-sensitive devices 8, 9, 10 and 11. The electrical outputs of the four photo-sensitive devices are applied to an electric circuit comprising stages 12, 13 and 14.

The two gratings 1 and 3 are spaced apart by a considerable gap. This renders the system insensitive to small changes in the spacing due to machine or grating inaccuracies.

The two gratings 1 and 3 each carry a pattern of parallel lines, preferably at right-angles to the direction of relative motion, and of the same period. The reflection of light from the grating 1 and its subsequent passage through grating 3 results in the formation of a spatially periodic distribution of light, appearing as a so-called "fringe pattern". The four photo-sensitive devices all receive light from substantially the same area of the scale grating 1, and are spaced apart in a direction perpendicular to the lengths of the rulings on the gratings so that they are spaced apart by 90° relative to the phase of the fringe pattern. Thus the outputs of devices 8 and 10 represent the fringe pattern at points 180° apart, as do the outputs of devices 9 and 11. Circuit stage 12 combines the outputs of devices 8 and 10, and of devices 9 and 11 to provide two signals 90° out of phase which are applied to stage 13. The two signals are processed to indicate both the sense and extent of any relative motion between the two members 2 and 4, and this indication is represented by an electric signal applied to the display or indicating stage 14.

The scale grating 1 may be transmissive with the light source behind it. The light emitted by the light source need not be diffuse, so long as the scale grating 1 is made so that light from it passing to the index grating 3 is at least partially diffuse. Operation in this mode is defined by the following equations:

$$b = \frac{a}{\frac{n_1 p_1 \sin\alpha}{n_2 p_2 \sin\beta} - 1} \qquad 1)$$

and $$p_3 = \frac{p_2 \sin\beta \,(a+b)}{n_1 a} \qquad 2)$$

where $n_1$ and $n_2$ are small integers which do not have a common integral divisor, $p_1$ and $p_2$ are the periods of the scale and index gratings respectively, $\alpha$ and $\beta$ are the angles between the optical axis and the scale and index gratings respectively, $a$ is the distance along the optical axis between the scale and index gratings, $b$ is the distance along the optical axis between the index grating and the detector means, and $p_3$ is the period of the resulting fringe pattern.

The embodiment just described requires the use of small photosensitive devices to ensure that they respond to the desired parts of the fringe pattern. Because of their small size a relatively small amount of light is collected by them. The modification shown in FIG. 2 enables larger devices to be used, with the resulting collection of larger quantities of light.

The only difference in the arrangement of FIG. 2 is the provision of a third grating 15 located between the index grating 3 and the photosensitive devices 8 to 11. This grating has a period slightly different from the period $p_3$ of the fringe pattern, and hence operates as a vernier grating to produce a fringe pattern of very much larger pitch, thus enabling larger photosensitive devices to be used.

The third grating may be in four sections, each of which is of the same period as the fringe pattern, but spatially dispaced 90° relative to one another.

Alternatively the grating 15 may have the same period as the fringe pattern but be arranged slightly skew, that is with its rulings not quite parallel to the lines of the fringe pattern. This will result in the production of a conventional Moire fringe pattern.

A third embodiment of the invention is illustrated in FIG. 3, which shows two additional features. The first of these is a lens 16, located between the index grating 3 and the detector means. This is used to focus the fringe pattern formed by grating 3 onto the detectors 8 to 11, and hence enable the distance between these to be reduced. The combined effect of lenses 7 and 16 is to produce an image of the light source 6 in the same plane as the fringe pattern.

The other feature shown in FIG. 3 is the inclusion of a glass block 17 which fills most of the space between gratings 1 and 3. This prevents the contamination of grating 3 itself.

When the second lens 16 is used, the distance $b_3$ along the optical axis between the lens and the detector means and the period $p_4$ of the resulting fringe pattern are given by the respective equations:

$$b_3 = \frac{f(b - b_2)}{f + b - b_2} \qquad 3)$$

and $$p_4 = \frac{b_3 p_3}{b - b_2} \qquad 4)$$

where $b$ and $p_3$ are the same quantities as for equations 1 and 2, $b_2$ is the distance along the optical axis between the index grating and the lens, and $f$ is the focal length of the lens.

The electrical circuitry is not described in detail, since many suitable circuit arrangements are well-known.

As indicated in the drawings, the source of diffuse radiation may be a conventional filament lamp, though other forms of radiation source may be used. The length of the filament ensures that the light falling on the scale grating 1 is at least partially diffuse. The use of diffuse light directed upon the scale grating has the effect of causing each reflective part of the grating to act as a source of diffuse illumination of the index grating.

It is for this reason that contamination of part or all of the relevant part of the scale grating by cutting fluids or swarf, or any other contaminant usually encountered, will have little effect on the illumination of the index grating apart from reducing the intensity of that illumination. Changes in the intensity of the illumination are taken care of by the use of the four photosensitive devices 8 to 11.

The light source need not be carried by the second member 4, though if it is carried by the other member 2, it must be an elongated source so as to illuminate the entire length of the scale grating 1.

The embodiments described above relate to linear relative motion between the two members. If the relative motion is circular, then radial gratings may be used.

The two gratings 1 and 3 need not be of the same pitch. If the pitch of the index grating 3 differs from that of the scale grating 1, then the fringe pattern will be formed in a plane without the use of a lens 16.

Lenses 7 and 16 may be replaced by suitable mirrors if this is preferred.

The spacing between the scale and index gratings may be from a few millimeters to a few centimeters. This is very much greater than conventional close-gap systems in which the gap is measured in thousandths of an inch.

What I claim is:

1. Apparatus for measuring or detecting the motion of a first member relative to a second member, which includes a scale grating of period $p_1$ attached to one of the two members and extending in a direction parallel to the direction in which relative motion is to be detected with the grating lines at an angle $\alpha$ with an optical axis, an index grating of period $p_2$ carried by the other of the two gratings with the grating lines at an angle $\beta$ to the optical axis, the distance along the optical axis between the two gratings being $a$, means for illuminating the scale grating directly with radiation such that radiation passing from a scale grating to the index grating is at least partially diffuse, and detector means located at a distance $b$ along the optical axis from the index grating and operable to detect the resulting spatially periodic fringe pattern of period $p_3$, the components of the apparatus being arranged so as to satisfy the following two relationships $$b = \frac{a}{\frac{n_1 p_1 \sin\alpha}{n_2 p_2 \sin\beta} - 1} \quad \text{and}$$

$$P_3 = \frac{p_2 \sin\beta \,(a + b)}{n_1 a}$$

where $n_1$ and $n_2$ are small integers which do not have a common integral divisor.

2. Apparatus as claimed in claim 1 in which the scale grating is a reflecting grating.

3. Apparatus as claimed in claim 1 in which the means for illuminating the scale grating is carried on the said other relatively movable member.

4. Apparatus as claimed in claim 1, in which the detector means includes a third grating of different pitch to the spatially periodic distribution of radiation.

5. Apparatus as claimed in claim 1 in which the detector means includes a third grating of the same pitch $p_3$ as the period of the fringe pattern and being skew with respect to the said periodic distribution of radiation.

6. Apparatus as claimed in claim 1 which includes an optical of focal length $f$ located at a distance $b_2$ along the optical axis from the index grating and at a distance $b_3$ along with the optical axis from the detector means, and to focus the spatially periodic fringe pattern onto the detector means, the value of $b_3$ being given by the expression $$b_3 = \frac{f(b - b_2)}{f + b - b_2},$$

and the period $p_4$ of the fringe pattern now being given by $$p_4 = \frac{b_3 p_3}{b - b_2},$$

where $b$ and $p_3$ are as defined in claim 1.

7. Apparatus as claimed in claim 6 in which the optical element is a lens.

8. Apparatus as claimed in claim 1 in which the gratings are linear gratings.

9. Apparatus as claimed in claim 1 in which the detector means includes four radiation-sensitive devices arranged to respond to different parts of the spatially periodic distribution of radiation derived from the same area of the scale grating.

10. Apparatus as claimed in claim 1 which includes means for enclosing the major part of the space between the scale grating and the index grating to prevent contamination of the index grating.

* * * * *